UNITED STATES PATENT OFFICE.

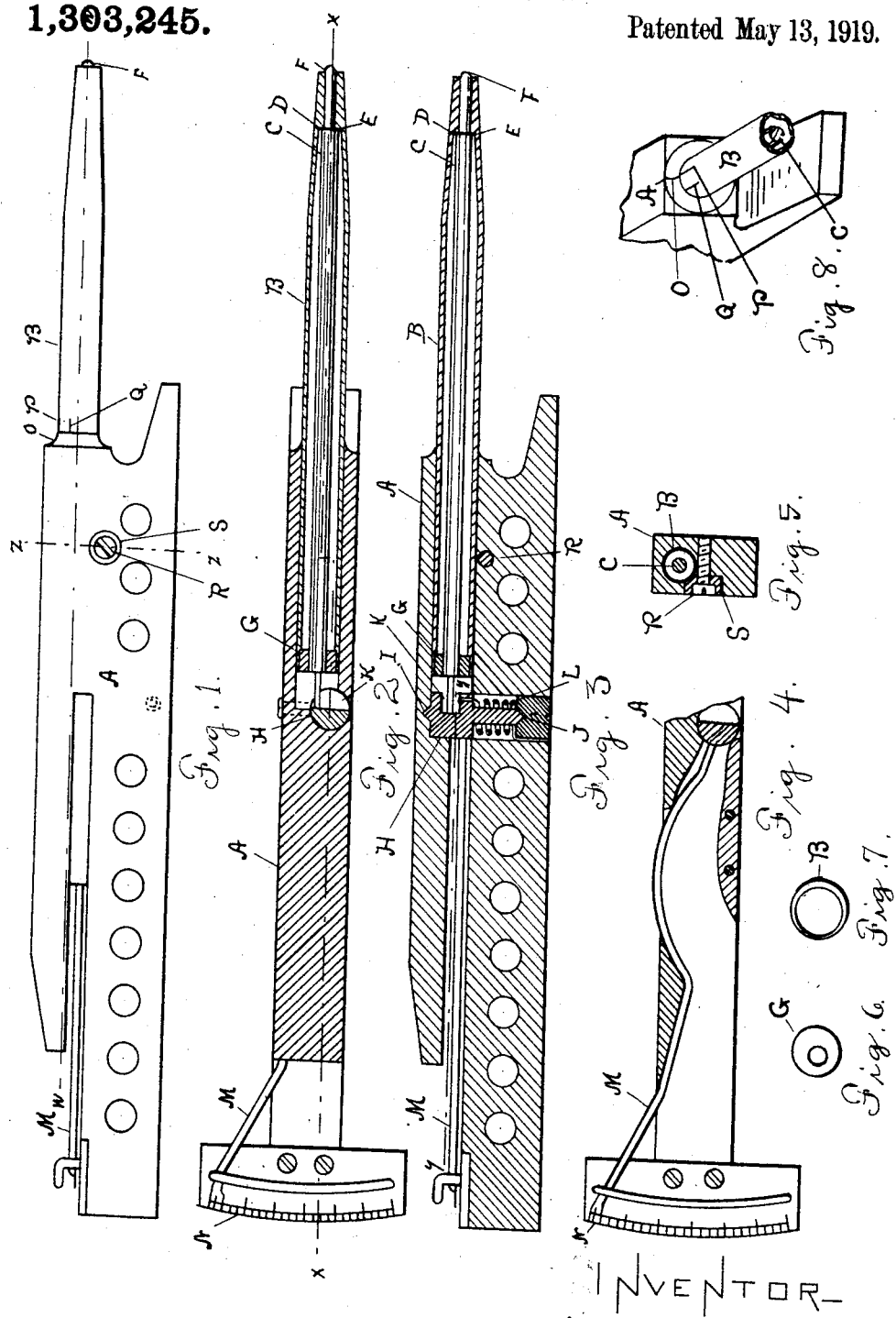

JOSEPH BOULET, OF STANDISH, MAINE.

MICROMETER-INDICATOR.

1,303,245.  Specification of Letters Patent.  Patented May 13, 1919.

Application filed March 1, 1918. Serial No. 219,745.

*To all whom it may concern:*

Be it known that I, JOSEPH BOULET, a citizen of the United States, residing at Standish, in the county of Cumberland and State of Maine, have invented certain new and useful Improvements in Micrometer-Indicators, of which the following is a specification.

This invention relates to improvements in micrometer indicators of the kind in which a longitudinally movable needle actuates a spring controlled oscillating pivot block which carries an index pointing arm, the free end of which is adapted to pass over a graduated scale, the needle in its longitudinal adjustment corresponding to the thickness, depth or size of an object in its path; such a device, for example, as is shown and described in Letters Patent No. 752,752, granted to me February 23, 1904.

It is well known that these instruments are adapted to be used in shops and factories where men of different nationalities are employed, especially where some men are familiar with the English system of measuring and where others are familiar only with the metric system.

My improvement relates especially to means for enabling a person by a simple change in a conveniently located part of the device to cause the indicator arm to measure on the scale according to different systems of measurement, for example, the English or the metric system.

In the drawings herewith accompanying and forming a part of this application, Figure 1 is a side elevation of a micrometer indicator; Fig. 2 is a horizontal sectional view of Fig. 1 taken on line $w$—$w$; Fig. 3 is a vertical sectional view taken on a line corresponding with line $x$—$x$, Fig. 2; Fig. 4 is a horizontal sectional view of a portion of the device taken on a line corresponding with line $y$—$y$, Fig. 3; Fig. 5 is a transverse sectional view of Fig. 1 taken on line $z$—$z$; Fig. 6 is an end view of the eccentric bushing; Fig. 7 is a detail end view of a carrier showing a modified form in which the eccentricity is in the carrier, and Fig. 8 is a detail perspective view illustrating the gage marks on the body of the device and on the sleeve which carries the needle.

The same reference characters indicate like parts in the several figures.

In the micrometer indicator which I have selected to illustrate the application of my invention, A is the body of the tool in one end of which is inserted a needle carrier B. In the needle carrier is a longitudinally movable needle C having a shoulder D adapted to engage an interior stop E in the end of the carrier. The end F of the needle, when the shoulder is against the stop, projects slightly beyond the end of the carrier. The other end of the needle passes through a bushing G in the opposite end of the carrier and into engagement with the oscillating pivot block H which is journaled in bearings I and J arranged in the body of the tool, as fully shown and described in my aforesaid patent and which need not be here in more detail described. The pivot block has a diametrically disposed slot K milled therein against the face of which rests the inner end of the needle. The pivot block is held yieldingly by a spring L, one end of which is attached to the block and the other end to the bearing. The pivot block carries an indicator arm M which is adapted to move back and forth over a graduated scale N preferably curved and positioned at or near the end of said arm, substantially as shown in said patent.

In adapting the tool for the purpose of the present invention the bushing inserted in the end of the needle carrier is bored eccentrically, as shown in Fig. 6, so that, when the carrier and the needle are rotated, the point where the end of the needle engages the pivot block is slightly varied and consequently the movement of the indicator arm is also varied in respect of its movement relative to the scale and the points at which the needle should engage the pivot block so as to cause the index arm to indicate any predetermined measurements as metric measurement or English measurement on the scale can be calculated. The needle carrier may be bored eccentrically as seen in Fig. 7 to receive a centrally bored bushing which causes the same result as would be the case where the bushing is bored eccentrically. For convenience I have marked on the outside of the tool body a stationary mark O and on the rotatable carrier two marks P and Q positioned so that, when the carrier marks register with the fixed stationary mark, the indicator gives the desired system of measurement. Any convenient means may be employed to hold the carrier against accidental rotation in the tool body. I have shown a screw R threaded into the body of the tool and a bonding block S adapted to be forced into engagement with the outside of the carrier by said screw when turned in to hold the carrier in position in the body.

I claim:

1. In a micrometer indicator, a graduated scale, a carrier, an index arm adapted to indicate measurements on said scale and an eccentric bushing in said carrier for adjusting said arm to indicate different systems of measurement on said scale.

2. In a micrometer indicator, a graduated scale, a pivot block, an oscillating index arm carried by said block, a needle for operating said block and index arm actuated by contact with the work and means for adjusting said index arm to indicate different systems of measurement on the same graduated scale due to changing the point at which the needle engages said block.

3. In a micrometer indicator, a graduated scale, a pivot block, an oscillating index finger carried by said block, a needle for operating said arm actuated by contact with the work, and means for adjusting said arm to indicate different systems of measurement on the same scale due to changing the point at which the needle engages said block; the tool body and carrier being provided with registering marks to guide the adjustment of the carrier to give the desired system of measurement.

In testimony whereof I affix my signature.

JOSEPH BOULET.

Copies of this patent may be obtained for five cents each, by addressing the "Commissioner of Patents, Washington, D. C."